No. 860,195. PATENTED JULY 16, 1907.
T. A. EDISON.
STORAGE BATTERY ELECTRODE.
APPLICATION FILED APR. 28, 1905.
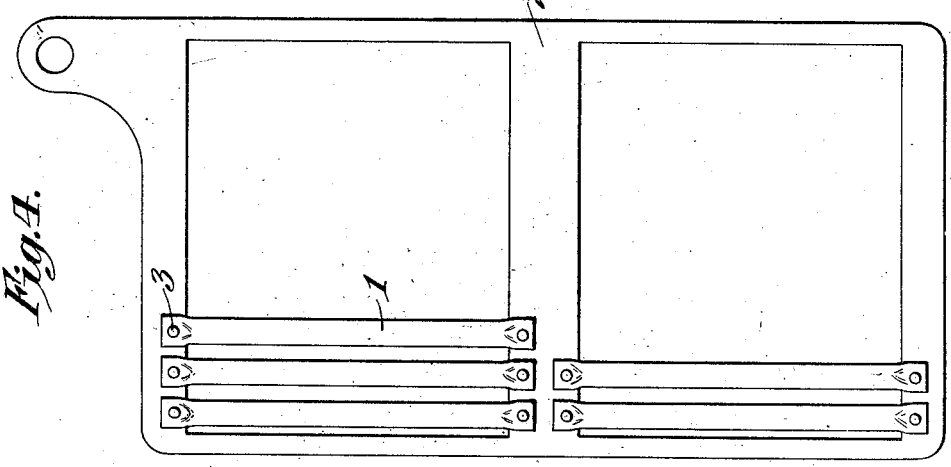
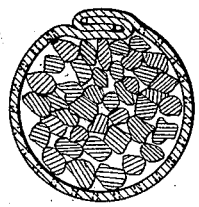
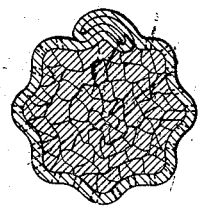
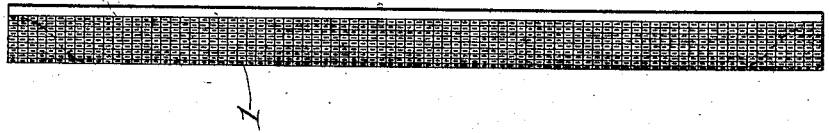
Attest:
Edgeworth Greene
Anna R. Kuhn
Inventor:
Thomas A. Edison
by
Frank L. Dyer, Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE-BATTERY ELECTRODE.

No. 860,195.    Specification of Letters Patent.    Patented July 16, 1907.

Application filed April 28, 1905. Serial No. 257,942.

*To all whom it may concern:*

Be it known that I, THOMAS ALVA EDISON, a citizen of the United States, residing at Llewellyn Park, Orange, in the county of Essex and State of New Jersey, have invented a certain new and useful Storage-Battery Electrode, of which the following is a description.

In an application for Letters Patent filed on even date herewith, by Jonas W. Aylsworth and myself, Serial No. 257,807 we describe an improved electrode for storage batteries of the Edison type, wherein the active material is supported in a number of small perforated tubular inclosing pockets having closed ends and carried by a suitable grid or electrode support. Owing to the non-elastic nature of such a tubular pocket, provision has to be made, as disclosed in said application, for securing the desired elastic pressure on the active material to maintain the particles in contact with the conducting films or flakes and in contact with the inclosing walls, as for instance, by relying on the gas pressure within the active mass, which pressure is retarded by suitably proportioning the size of the apertures in the inclosing pocket relatively to the viscosity of the solution used, or by employing flakes or films of an elastic metal, such as cobalt or cobalt-nickel alloy.

My present invention relates to an improvement on the electrode referred to, by which I am enabled to secure a high degree of elasticity of the pocket walls to thereby accommodate variations in bulk within the active mass, and at the same time maintaining the desired elastic pressure on the active mass to keep the particles thereof always firmly in contact with the conducting films or flakes and with the conducting walls, the process of manufacture being such that the area of contact will be very largely increased as will be explained, whereby the efficiency of the electrode will be much improved.

My object, generally, is to provide an electrode of simple construction, capable of being readily and economically manufactured and assembled, and wherein a minimum amount of flake-like material may be employed to secure the maximum degree of conducting capacity. By thus reducing the amount of flake-like conducting material to the minimum, I effect a considerable diminution in cost and weight.

To this end the invention consists in longitudinally corrugating or fluting the tubular conducting pockets after the active material has been introduced within the same, whereby the active material will be more closely packed together to increase the area and degree of contact between the active particles and the conducting flakes or films and between the active particles and the conducting walls, and furthermore, making the pocket elastic, so that it may accommodate variations in bulk of the active material, and at the same time resulting in the application of substantially continuous elastic pressure on the active mass.

In order that the invention may be better understood attention is directed to the accompanying drawings, forming part of this specification and in which Figure 1 is a side elevation of one of the tubular inclosing pockets, illustrating in dotted lines, the manner of flattening and closing the ends thereof. Fig. 2 a cross-sectional view on an enlarged scale through a pocket, before the latter is corrugated. Fig. 3 a corresponding view, showing one form of corrugations and Fig. 4 an elevation, illustrating a complete electrode with the pockets in position.

In these views, corresponding parts are represented by the same numerals of reference.

As described in said Edison and Aylsworth application, the tubes 1 are made preferably of very thin perforated sheet iron or nickel, thinly coated on each side with cobalt-nickel alloy to improve the contact, and after the seam is formed, the tubes are subjected to a sufficiently high temperature in hydrogen to weld the seam throughout, resulting in the production of a substantially continuous tube. After the tubes have been filled with the active material, as described in the said application, or in any other suitable way, they are corrugated longitudinally (see Fig. 3) by any suitable arrangement of dies, or otherwise, whereby the active material will be compressed to consolidate the mass and improve the area and degree of contact between the active particles and the conducting films or flakes, and at the same time elasticity of the pocket walls will be secured to accommodate any variations in bulk of the active material and to always exert the desired elastic pressure thereon. It will be, of course, understood, that instead of forming the corrugations completely around the entire periphery of the tube, the corrugations may be formed only for a portion of its circumference, the idea being to secure elasticity and to consolidate the active mass to the desired extent. I find that if the pocket walls are not corrugated, it is practically impossible to secure as good contact and as extensive an area of contact between the active particles and the conducting films or flakes and the pocket walls; in fact minute interstices are formed throughout the active mass, which are not closed by the application of a tamping pressure. As observed under the microscope, few of the particles are in flat contact with the conducting films or with the pocket walls; some of them are practically out of contact with the conductors and many particles make contact with the conductors only at the angles or corners which the particles present.

In Fig. 2, I have illustrated diagrammatically, although of course to an exaggerated extent, the general arrangement of active particles, which might take place if a tamping pressure were alone used, the contact films or flakes being omitted for the purpose of clearance. By applying a very great corrugating pressure to the tubular pockets, as explained, the active mass will be consolidated to force all the particles in contact with the conducting films and pocket walls and to actually crush the particles to increase the area of contact, as shown generally in Fig. 3. By corrugating the pocket walls, as explained, I do away with the necessity of providing for the imposition of elastic pressure from within the mass, as described in said Edison and Aylsworth application, and although when first constructed, the active mass within each pocket is very closely consolidated, yet, the elasticity of the pockets is sufficient to accommodate not nly the general, but limited swelling, which takes place by absorption of the electrolyte, and due also to gas pressure, but also the variations in bulk, due to charging and discharging.

The corrugated tubular pockets formed, as explained, are assembled in a suitable support or grid in any desired manner, thus in Fig. 4 I illustrate a grid having two open panels over which the corrugated tubular pockets are secured by rivets 3 in two horizontal rows. Obviously, however, the pockets may be supported in many other ways than that illustrated.

Having now described my invention, what I claim as new therein and desire to secure by Letters Patent is as follows:—

1. An electrode unit for alkaline storage batteries, comprising a perforated tubular longitudinally corrugated metallic insoluble inclosing pocket, having active material therein under elastic pressure and affording the entire support for the active material, substantially as set forth.

2. An electrode unit for alkaline storage batteries, comprising a perforated tubular longitudinally corrugated metallic insoluble inclosing pocket, having active material therein under elastic pressure and affording the entire support for the active material and having flattened ends, substantially as set forth.

3. An electrode for alkaline storage batteries, comprising a perforated tubular longitudinally corrugated inclosing pocket, having active material therein under elastic pressure, said pocket having a welded coating of nickel-cobalt alloy applied to the same, substantially as set forth.

4. An alkaline storage battery electrode, comprising an electrode support, a plurality of perforated tubular longitudinally corrugated metallic insoluble pockets carried by the same, and containing active material under elastic pressure and affording the entire support for the active material, substantially as set forth.

5. An alkaline storage battery electrode, comprising an electrode support and a plurality of perforated tubular longitudinally corrugated metallic insoluble inclosing pockets riveted throughout and carrying active material under elastic pressure and affording the entire support for the active material, substantially as set forth.

This specification signed and witnessed this 26th day of April 1905.

THOS. A. EDISON.

Witnesses:
FRANK L. DYER,
ANNA R. KLEHM.